May 23, 1967  J. J. STAMM  3,321,684
LOCOMOTIVE GENERATOR-FED PLURAL MOTOR CONTROL SYSTEM
Filed June 25, 1963  2 Sheets-Sheet 2

United States Patent Office 3,321,684
Patented May 23, 1967

3,321,684
LOCOMOTIVE GENERATOR-FED PLURAL
MOTOR CONTROL SYSTEM
John J. Stamm, Franklin Township, Westmoreland County, Pa., assignor to Westinghouse Electric Corporation, Pittsburgh, Pa., a corporation of Pennsylvania
Filed June 25, 1963, Ser. No. 290,374
2 Claims. (Cl. 318—71)

This invention relates, generally, to control systems and, more particularly, to systems for controlling the operation of locomotives having generators driven by prime movers for supplying current to electric motors which propel the locomotives.

A modern engine of the gas turbine type, which is capable of developing a relatively large amount of horse power, may be utilized to drive the generator which supplies current to the motors of a locomotive. In view of the large amount of power made available on one locomotive, it is desirable to correlate the operation of the engine, the generator and the motors in order to simplify and improve the operation of the locomotive.

An object of the invention is to reduce wheel slippage on an electrically propelled locomotive.

Another object of the invention is to utilize static devices for controlling the excitation of the generator and the motors of a locomotive.

A further object of the invention is to provide electric braking for a self-propelled locomotive.

Still another object of the invention is to simplify the reversing of an electrically driven locomotive.

Other objects of the invention will be explained fully hereinafter or will be apparent to those skilled in the art.

In accordance with one embodiment of the invention, the traction motors of a locomotive are connected in parallel across a generator driven by a prime mover. The generator and the motors are separately excited by a three-phase auxiliary generator driven by the prime mover. The generator excitation may be controlled by saturable reactors or magnetic amplifiers having voltage control windings and load control windings thereon. Other static devices, such as controlled rectifiers, may be utilized if desired. The energization of the voltage windings is controlled by a master controller and the energization of the load windings is controlled by the engine governor. The excitation of the motors is also controlled by saturable reactors having control windings responsive to the motor current and to operation of the engine governor. Electric braking is obtained by over-exciting the motors to cause them to act as generators to supply current to the main generator which acts as a motor driving the prime mover. The braking is controlled by a braking controller which takes over the control of the excitation of the motors. Wheel slippage is reduced by connecting the motors in parallel and is minimized by cross connecting the control windings on the motor field reactors and the shunts in the motor circuits which energize the control windings.

For a better understanding of the nature and objects of the invention, reference may be had to the following detailed description, taken in conjunction with the accompanying drawing, in which.

Figure 1:
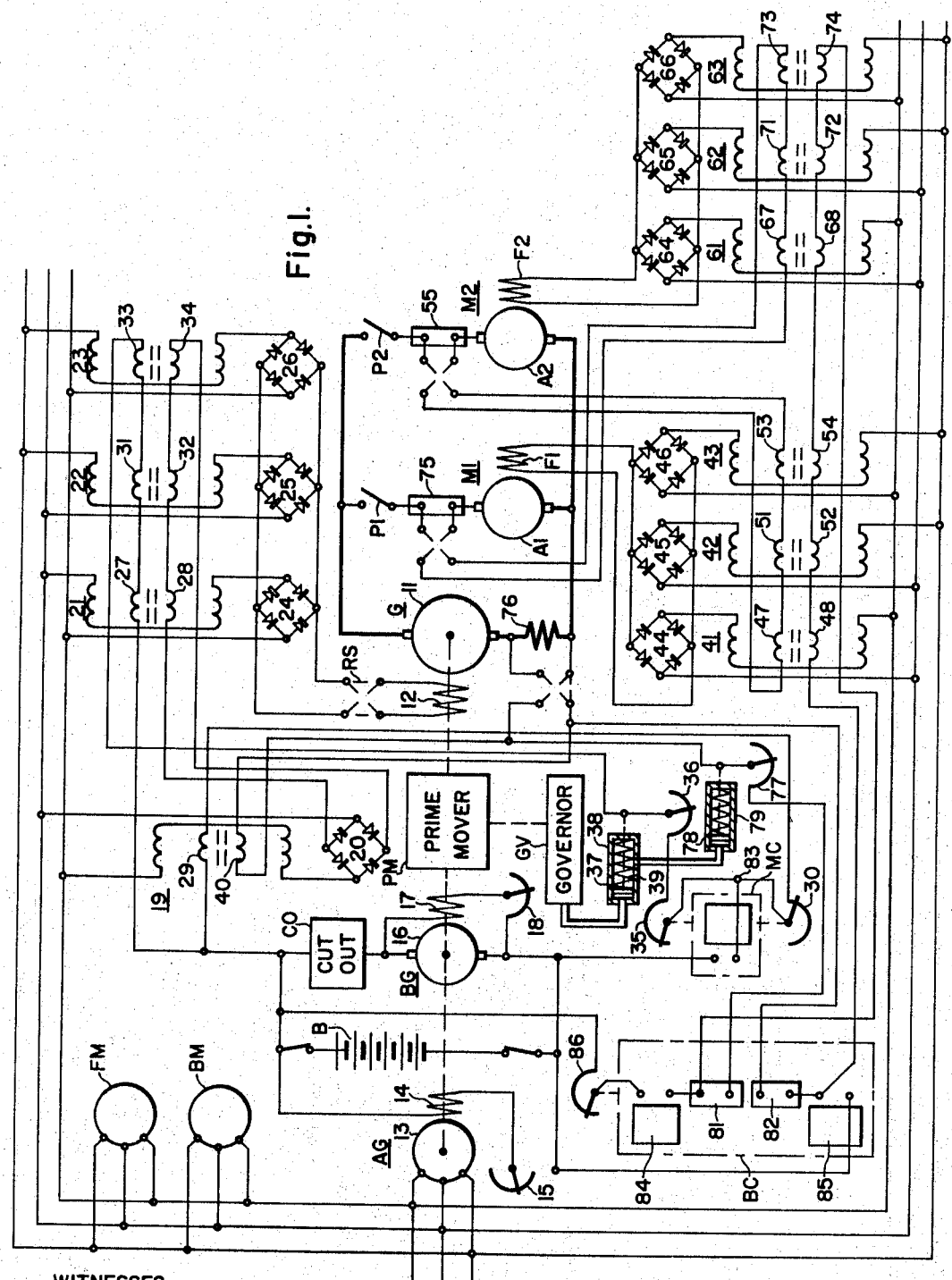
FIG. 1 is a diagrammatic view of a locomotive control system embodying principal features of the invention.

Referring to the drawing, and particularly to FIG. 1, the system shown therein comprises a main generator G, an auxiliary generator AG, a battery charging generator BG, a prime mover PM for driving the main generator G and the auxiliary generator AG and battery charging generator BG, two traction motors M1 and M2, a fan motor FM and a blower motor BM. As shown, the generator G is of the direct current type having an armature winding 11 and a separately excited field winding 12. The generator G supplies current for operating the traction motors M1 and M2. It will be understood that an alternating current generator may be utilized in place of the direct current generator and the alternating current rectified to supply the motors M1 and M2 with direct current.

The auxiliary generator AG is preferably of the three-phase alternating current type having an armature winding 13 and a field winding 14. The field winding 14 is energized from a battery B which is maintained charged by the generator BG. The voltage at the generator AG may be adjusted by means of a rheostat 15 connected in series with the battery B and the field winding 14. The generator BG has an armature winding 16 and a shunt field winding 17. A rheostat 18 is connected in the circuit of the shunt field winding 17 to adjust the charging rate of the battery. The armature winding 16 is connected across the battery B in series with a battery cutout CO.

The auxiliary generator AG may be utilized for supplying power to auxiliary equipment, such as the radiator fan motor FM and the traction blower motor BM. The auxiliary generator is also utilized for supplying the excitation current for the main generator field winding 12 and field windings F1 and F2 of the traction motors M1 and M2, respectively, as will be described more fully hereinafter.

As shown, armature windings A1 and A2 of the motors M1 and M2, respectively, are connected across the armature 11 of the generator G in parallel-circuit relation. The motors M1 and M2 are utilized for propelling a locomotive or other vehicle. It will be understood that additional motors may be provided and connected across the generator G in the same manner as motors M1 and M2.

Since the generator is separately excited without any differential or series winding and the motors M1 and M2 are also separately excited, reversing of the motors may be accomplished by means of a single reversing switch RS which reverses the direction of the excitation current in the generator field winding 12. Reversing the field of the generator G reverses the polarity of the generator, thereby reversing the current in the armature windings of the motors M1 and M2 which reverses the direction of rotation, since the current in the field windings F1 and F2 is not reversed with the armature current.

The prime mover PM may be an internal combustion engine, such as a diesel engine, or it may be a gas turbine. It is assumed that the prime mover is provided with a suitable fuel supply system (not shown). The operation of the prime mover is controlled by a master controller MC in the customary manner by either electrical, mechanical, or pneumatic means. The prime mover is provided with a governor GV which is responsive to the speed of the prime mover and functions to govern the speed in the usual manner. A braking controller BC is provided for controlling electrical braking of the locomotive in a manner which will be described more fully hereinafter.

As explained hereinbefore, the excitation current for the field winding 12 of the main generator G is supplied by the three-phase generator AG. Three saturable reactors 21, 22 and 23 are connected to the three-phase generator and the output of the reactors is rectified by three full-wave rectifiers 24, 25 and 26 which are connected to the field winding 12 through the reversing switch RS. The reactor 21 is provided with control windings 27 and 28, the reactor 22 is provided with control windings 31 and 32 and the reactor 23 has control windings 33 and 34. The control windings function to control the operation of the reactors by controlling the saturation of the reactors, thereby controlling the amount of alternating current permitted to flow through the main windings of the reactors. The control windings 27, 31 and 33 are energized from the battery B. The energization of these control windings is controlled by a rheostat 35, which is actuated by the master controller MC, and a rheostat 36 which is actuated by the governor GV in any suitable manner. Thus, the rheostat 36 may be operated by a piston 37 disposed in a cylinder 38 which is supplied with oil under pressure by means of the governor GV. A spring 39 in the cylinder 38 opposes movement of the piston 37 by the oil pressure from the governor.

In order to provide a means for limiting the motor current to a definite amount as a function of the master controller position, another saturable reactor 19 is utilized to control the current in the control windings 28, 32 and 34 of the generator field reactors. The reactor 19 has a control winding 29 which is connected to the battery B in series with a rheostat 30 actuated by the controller MC. Another control winding 40, which opposes the winding 29 is energized by the voltage drop across an interpole winding 76 on the generator G.

Thus, if the ampere turns of the winding 40 exceed the ampere turns of the winding 29 a current will flow from the reactor 19 to a rectifier 20 and thence to the control windings 28, 32 and 34 which are in opposition to the windings 27, 31 and 33 on the reactors 21, 22 and 23, respectively. Accordingly, the resulting ampere turns acting on the generator field reactors are reduced, thereby reducing the generator field excitation and hence the generator current to the value set by the master controller.

In order to obtain series characteristics of the motors the excitation of the motor fields is controlled by saturable reactors having control windings energized by shunts connected in the motor armature circuits.

The excitation current for the field winding F1 of the motor M1 is supplied by the auxiliary generator AG through saturable reactors 41, 42, and 43. The output of the reactors is rectified by rectifiers 44, 45 and 46 which are connected to the field winding F1. The reactor 41 has control windings 47 and 48, the reactor 42 is provided with control windings 51 and 52 and the reactor 43 has control windings 53 and 54. The control windings 47, 51 and 53 are connected in series across a shunt 55 which is in the armature circuit of the motor M2.

The field winding F2 of the motor M2 is supplied with current through saturable reactors 61, 62 and 63 which are connected to the auxiliary generator AG. The output of the reactors is rectified by rectifiers 64, 65 and 66. The reactor 61 has control windings 67 and 68, the reactor 62 has control windings 71 and 72, and the reactor 63 is provided with control windings 73 and 74. The control windings 67, 71 and 73 are connected in series across a shunt 75 which is connected in the armature circuit of the motor M1. Thus, control windings for the reactors which control the current in the field winding F1 are responsive to the armature current in the motor M2, and control windings on the reactors which control the current in the field winding F2 are responsive to the armature current in the motor M1. The cross connecting of the control windings for the reactors which control the current in the motor fields reduces the tendency of the wheels driven by the respective motors to slip on the rails of the track over which the locomotive runs.

The control windings 48, 52, 54, 68, 72 and 74 of the two groups of saturable reactors are connected in series across an interpole winding 76 of the main generator G. The control windings which are energized by the interpole winding oppose the control windings which are energized by the shunts in the armature circuits of the traction motors. The current in the control windings connected across the interpole winding 76 is controlled by a rheostat 77 which is actuated by a piston 78 disposed in a cylinder 79 which is supplied with a fluid from the governor GV in a manner which will be described more fully hereinafter.

It will be noted that the circuit from the interpole winding 76 to the control windings on the reactors extends through contact segments 81 and 82 on the braking controller BC. Thus, control of the field current for the motors is assumed by the braking controller during electrical braking as will be explained more fully hereinafter.

Assuming that the reversing switch RS is in the proper position for the desired direction of operation of the locomotive, that the prime mover is running, and that switches P1 and P2 are closed to connect the armature windings A1 and A2 of the traction motors to the generator G, the locomotive may be accelerated by operating the master controller MC. When the controller MC is operated the energizing circuit for the control windings on the reactors 21, 22 and 23 is established through a contact segment 83 on the controller MC. The energization of the control windings of these reactors permits excitation current to flow through the field winding 12 of the main generator G, so that the generator voltage builds up and causes current to flow through the armature windings of the motors M1 and M2. Simultaneously with the increase of the motor armature current, the control windings on the saturable reactors for the motor field windings are energized to permit current to flow through the field windings F1 and F2 of the motors. The generator voltage is increased by operting the master controller to actuate the rheostat 35 thereby decreasing the resistance in the control windings 27, 31 and 33 on the reactors 21, 22 and 23, respectively.

Assuming satisfactory adhesion conditions, the engineer can operate the master controller to the maximum running position. The ampere turns set up by the circuit connected to the rheostat 30 will permit the ampere turns from the interpole 76 to balance at the maximum value established. The generator current, therefore, cannot exceed this value and acceleration will take place along the line AB on the curve in FIG. 2. Since this represents constant current, it also represents constant motor flux, which gives a desirable starting characteristic.

Should slipping occur due to bad rail conditions, the return of the master controller to a lower position, just below the slipping point, will establish a smaller current setting which will start the locomotive smoothly. As previously expained, slipping is still further reduced by cross-connecting the control windings of the motor field saturable reactors in the manner hereinbefore described. The establishment of a current limit is particularly useful on locomotives where the axle loading is high and where slipping does not occur until the motor current exceeds safe values.

Figure 2:
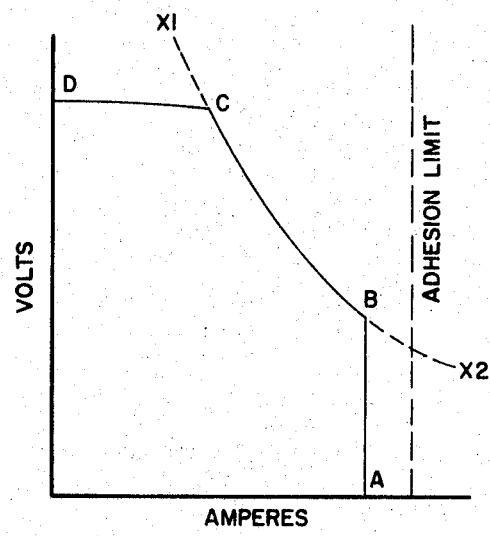
FIG. 2 is a curve showing operating characteristics of the main generator which is driven by a prime mover.

Assuming that the control is handled so as not to exceed the adhesion limits, the generator current and voltage will follow the heavy lines of the curve in FIG. 2 until the line of constant horsepower, X1–X2, is reached at point B. When the volt and ampere values exceed the constant horsepower line, the prime mover is overloaded and will slow down. The governor will attempt to correct this by inserting resistance into the control circuit of the generator saturable reactors by means of the rheostat 36 which is operated by the governor, thus reducing the generator excitation. Further acceleration of the locomotive will increase the counter-electro-motive force of the motors, and thus reduce the motor current. The generator output will drop below the constant horsepower line and the prime mover will increase its speed. The governor will then be actuated to decrease the resistance in the generator field control circuit, thereby raising the generator voltage until the constant horsepower line is again reached.

Further acceleration will gradually raise the generator voltage to its maximum value, point C on the curve in FIG. 2. The generator excitation is now at its maximum and the rheostat 36 has all its resistance cut out. Further acceleration will result in unloading of the prime mover and the generator voltage would normally follow the line C–D. In order to prevent this, field weakening of the motors is utilized. When the rheostat 36 for the load control has reached its maximum position (all resistance cut out), a port in the cylinder 38 is exposed to admit oil pressure to the piston 78 in the cylinder 79 to actuate the rheostat 77.

Thus, when the generator voltage and excitation have reached the maximum value obtainable, unloading of the prime mover will cause the governor to feed additional oil through the load regulator cylinder port, mentioned above, to the field weakening rheostat cylinder 79. The movement of the field weakening rheostat 77 permits current to flow in the control windings 48, 52, 54, 68, 72 and 74 of the motor field saturable reactors. This current is in opposition to the control current obtained from the motor armature shunts. Thus, a small amount of field shunting or field weakening is obtained which will raise the motor armature current and will bring the loading back to the constant horsepower line. Further acceleration will bring corresponding correction from the field weakening rheostat until maximum field weakening is reached. Thus, it is apparent that field weakening can be made a smooth, even process, by providing the field weakening rheostat with an adequate number of resistance steps.

Throughout the field weakening operation, the motor current will stay practically constant which means that the motor field strength will remain constant, unless weakened by governor action. This mode of field shunting results in maximum generator efficiency and lower generator and motor heating. Since the rate of field weakening can be made relatively slow, a wheel slip will not cause the speed of the motor to rise very much above the normal speed. As previously mentioned, the cross-connection of the motor field control windings will further insure stable non-slip operation.

Figure 3:
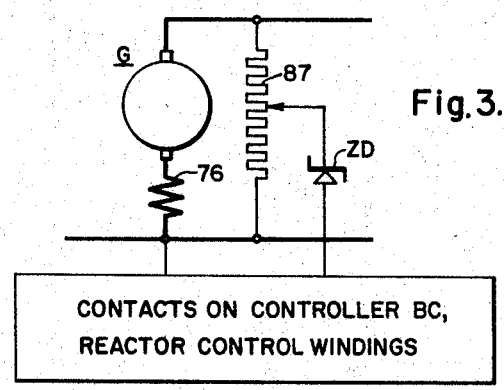
FIG. 3 is a detail view showing an alternative means for controlling field shunting of the traction motors.

As shown in FIG. 3, field weakening can be controlled by means of a Zener diode ZD having a voltage breakdown rating of the generator voltage at which the prime mover unloading begins (point C). The Zener diode is connected to a resistor 87 to be responsive to the generator voltage, and the current from the diode ZD is used to energize the control windings 48, 52, 54, 68, 72 and 74 on the motor field reactors to control field weakening. Thus, the rheostat 79, piston 78 and cylinder 79 may be omitted from the system.

It is apparent that the traction motors can be converted into generators simply by making the field weakening turns of the control windings on the saturable reactors additive instead of opposing the control windings energized by the shunts in the motor circuits. Thus, electric braking of the locomotive can be established by operating the braking controller BC to transfer the energization of the one group of control windings from the interpole winding 76 to the battery B. When the controller BC is actuated from the off position shown to a braking position, the circuits through the segments 81 and 82 on the controller are interrupted and these circuits are transferred to segments 84 and 85, thereby connecting the control windings 48, 52, 54, 68, 72 and 74 across the battery B in series with a rheostat 86 which is actuated by the braking controller BC. In this manner the motors M1 and M2 may be over excited and caused to function as generators to supply current to drive the generator G as a motor which, in turn, drives the prime mover PM to absorb the braking energy. The braking rate is controlled by operating the braking controller BC which operates the rheostat 86 to control the current in the control windings of the saturable reactors for the motor fields. In this manner, transition from power operation to braking can be accomplished without requiring the operation of power switches and the transition from power to braking can be made smooth.

It will be understood that static control devices of other types, such as magnetic amplifiers, or silicon controlled rectifiers may be utilized in place of the saturable reactors herein shown and described. Furthermore, means other than the engine governor may be utilized for obtaining a speed signal for the field control system. For example, the frequency of the A.C. generator driven by the prime mover may be utilized to supply a signal to a magnetic amplifier which will add or subtract from the main generator field control current and thereby maintain constant horsepower output.

From the foregoing description it is apparent that the present control scheme simplifies the operation of a locomotive driven by a prime mover. It eliminates large reversers, field shunting relays, contactors and resistors. Since the saturable reactors, magnetic amplifiers or other static control devices, when once adjusted, need no maintenance, appreciable savings can be realized. The flexibility of the present system permits the motors to be operated in a manner to obtain performance characteristics of series, compound or separately excited motors by connecting the respective control windings accordingly. During braking, the D.C. generator and the prime mover can be utilized to absorb the braking energy.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In combination, a direct current generator having an armature and a field winding, a prime mover for driving the generator, separate excitation means for the generator field winding, said excitation means including saturable reactor control means for controlling the generator field current, a controller, the saturable reactor means having first control winding means energized in response to the position of said controller and to the speed of the prime mover, the saturable reactor means having second control winding means for limiting the generator current, the second control winding means being energized in response to the generator current and the position of the controller, a plurality of motors having armatures connected to the generator and having field windings, separate excitation means for the motor field windings, said last mentioned excitation means including saturable reactor control means for controlling the excitation of the motor field windings, the last mentioned saturable reactor means having first control winding means energized in response to the motor current and second control winding means energized in response to the generator current and the speed of the prime mover to reduce the motor field current when the generator field excitation has reached its maximum value, and braking means including a braking controller for effecting energization of the second control winding means of the last mentioned saturable reactor means to increase the motor field excitation to effect operation of the motors as generators for braking action.

2. In combination, a direct current generator having an armature and a field winding, a prime mover for driving the generator, separate excitation means for the generator field winding, said excitation means including saturable reactor control means for controlling the generator field current, a controller, the saturable reactor means having first control winding means energized in response to the position of said controller and to the speed of the prime mover, the saturable reactor means having second control winding means for limiting the generator current, the second control winding means being energized in response to the generator current and the position of the controller, at least one pair of motors having armatures connected to the generator and having field windings, separate excitation means for the motor field windings, said last mentioned excitation means including separate saturable reactor control means for controlling the excitation of each of the motor field windings, the saturable reactor means of each motor of a pair having first control winding means energized in response to the armature current of the other motor of the pair and having second control winding means energized in response to the generator current and the speed of the prime mover to reduce the motor field current when the generator field excitation has reached its maximum value, and braking means including a braking controller for effecting energization of the second control winding means of each of the last mentioned saturable reactor means to increase the motor field excitation to effect operation of the motors as generators for braking action.

References Cited by the Examiner

UNITED STATES PATENTS

| | | | |
|---|---|---|---|
| 2,315,386 | 3/1943 | Baldwin | 318—71 X |
| 2,329,538 | 9/1943 | Huston | 318—143 |
| 2,393,618 | 1/1946 | Edwards | 318—154 X |
| 2,393,619 | 1/1946 | Edwards | 318—154 X |
| 2,393,622 | 1/1946 | Adams | 318—154 X |
| 2,626,362 | 1/1953 | Johansson | 318—52 X |
| 3,183,422 | 5/1965 | Stamm | 318—52 |
| 3,263,142 | 7/1966 | Adoutte et al. | 318—143 X |

FOREIGN PATENTS 1,337,022  10/1962  France.

ORIS L. RADER, *Primary Examiner.*

MILTON O. HIRSHFIELD, *Examiner.*

T. LYNCH, *Assistant Examiner.*